(12) United States Patent
Wakabayashi et al.

(10) Patent No.: US 8,545,027 B2
(45) Date of Patent: Oct. 1, 2013

(54) LIGHT CONTROL APPARATUS AND PROJECTOR

(75) Inventors: Shinichi Wakabayashi, Suwa (JP); Kanji Yoshida, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 182 days.

(21) Appl. No.: 13/159,944

(22) Filed: Jun. 14, 2011

(65) Prior Publication Data
US 2011/0310358 A1 Dec. 22, 2011

(30) Foreign Application Priority Data

Jun. 22, 2010 (JP) .................. 2010-141395

(51) Int. Cl.
G03B 21/14 (2006.01)
(52) U.S. Cl.
USPC ............ 353/88; 353/31; 353/38; 353/94; 353/97; 353/98; 396/505; 396/507
(58) Field of Classification Search
USPC ............. 353/30, 31, 38, 88, 69, 94, 97–99, 353/119; 359/250, 253, 622, 627, 634, 738–739; 349/5, 349/7–9; 396/505, 507
See application file for complete search history.

(56) References Cited

U.S. PATENT DOCUMENTS

| 6,866,431 | B2 * | 3/2005 | Namazue et al. ............ 396/450 |
| 7,126,766 | B2 * | 10/2006 | Tomita ........................ 359/739 |
| 7,798,653 | B2 * | 9/2010 | Inui et al. ....................... 353/97 |
| 7,993,017 | B2 * | 8/2011 | Yamada et al. ................. 353/97 |
| 2009/0225389 | A1 | 9/2009 | Nakano |

FOREIGN PATENT DOCUMENTS

| JP | A-2009-216906 | 9/2009 |
| JP | A-2009-244848 | 10/2009 |

* cited by examiner

Primary Examiner — Georgia Y Epps
Assistant Examiner — Sultan Chowdhury
(74) Attorney, Agent, or Firm — Oliff & Berridge, PLC

(57) ABSTRACT

A light control apparatus that controls the amount of light passing therethrough by blocking part of an incident light flux, includes: a pair of pivotal members having pivotal axes extending along a direction substantially perpendicular to a central axis of the light flux; and a pair of light blocking members held by the pair of pivotal members and changing the size of a light blocking area as the pair of pivotal members pivot, the light blocking area blocking part of the light flux, wherein the pivotal axes are located in positions that overlap with an area where the light flux passes, and the pair of light blocking members are located in positions that do not overlap with the pivotal axes.

12 Claims, 5 Drawing Sheets

LIGHT CONTROL APPARATUS AND PROJECTOR

BACKGROUND

1. Technical Field

The present invention relates to a light control apparatus and a projector.

2. Related Art

There is a known projector including a light source apparatus, a light modulation apparatus that modulates a light flux emitted from the light source apparatus, a light control apparatus that controls the amount of light flux to be incident on the light modulation apparatus, and a projection optical apparatus that enlarges and projects the light flux modulated by the light modulation apparatus. Since a projector is required to be portable because it is carried to and used in a variety of places in many cases, a light control apparatus that allows the size of the projector to be reduced has been proposed (see JP-A-2009-216906, for example).

The light control apparatus described in JP-A-2009-216906 is disposed between a pair of lens arrays for uniformly illuminating an image formation area of the light modulation apparatus with a light flux, that is, between a first lens array disposed on the upstream side of the optical path and a second lens array disposed on the downstream side of the optical path. A pair of light blocking members are so disposed that they do not overlap with pivotal axes of a pair of gears (pivotal members), and the pivotal axes are so disposed that they overlap with the second lens array. The configuration described above allows the distance between the first lens array and the light blocking members to be reduced and hence the size of the light control apparatus to be reduced as compared with a case where the light blocking members overlap with the pivotal axes or a case where the pivotal axes are located outside the second lens array in the width direction thereof.

In the light control apparatus described in JP-A-2009-216906, however, in which the gears are separated far away from the first lens array toward the downstream side of the optical path so that the distance between the first lens array and the light blocking members is reduced, the radii of the gears are not reduced in some cases. The distance between the pair of lens arrays can be reduced but the width of the light control apparatus in the direction perpendicular to the optical axis of the light flux may not be reduced, disadvantageously resulting in insufficient reduction of the size of the projector. Further, in a maximum light blocking state (see FIG. 9 in JP-A-2009-216906), in which the pair of light blocking members are so positioned that the tips thereof are separated from each other by a certain amount, the amount of light passing through the light control apparatus may not be sufficiently reduced in the maximum light blocking state or the light control may not be smoothly performed from a minimum light blocking state to the maximum light blocking state.

SUMMARY

An advantage of some aspects of the invention is to solve at least part of the problems described above and the invention can be implemented as the following forms or applications.

Application Example 1

This application example is directed to a light control apparatus that controls the amount of light passing therethrough by blocking part of an incident light flux includes a pair of pivotal members having pivotal axes extending along a direction substantially perpendicular to a central axis of the light flux and a pair of light blocking members held by the pair of pivotal members and changing the size of a light blocking area as the pair of pivotal members pivot, the light blocking area blocking part of the light flux. The pivotal axes are located in positions that overlap with an area where the light flux passes, and the pair of light blocking members are located in positions that do not overlap with the pivotal axes.

According to the configuration described above, since the pivotal axes of the pair of pivotal members are located in positions that overlap with the light flux passing area, the distance between the pivotal axes is shorter than that in a case where the pivotal axes are located outside the light flux passing area. Since the radii of pivotal motion of the pivotal members can therefore be reduced, the sizes of the pivotal members can be reduced. Further, since the pair of light blocking members are located in positions that do not overlap with the pivotal axes, the light blocking members are readily located in positions that allow the amount of light passing therethrough to be reduced in the maximum light blocking state even when the sizes of the pivotal members are reduced. As a result, the sizes of the pivotal members can be reduced while the amount of light passing through the light control apparatus is controlled in a satisfactory manner, whereby the size of the light control apparatus can be reduced.

Further, since the radii of pivotal motion of the pivotal members are reduced, the angular range over which the pivotal members pivot can be increased as compared with a case where the pivotal axes are located outside the light flux passing area. As a result, the size of the light blocking area can be changed more moderately as the pivotal members pivot, whereby the light control can be more smoothly performed.

Application Example 2

In the light control apparatus according to the above application example, it is preferable that the pair of light blocking members are located on the upstream side of the pivotal axes in the optical path direction of the light flux when the light blocking area is maximized, and that the pair of light blocking members are moved outward with respect to the light flux passing area as the light blocking area becomes smaller.

According to the configuration described above, the light blocking members are located on the upstream side of the pivotal axes in the optical path direction of the light flux in the maximum light blocking state. Since the light flux spreads outward as it travels toward the downstream side of the optical path, locating the light blocking members on the upstream side of the optical path reduces the amount of light passing through the light blocking members in the maximum light blocking state. Further, since the light blocking members are located outside the light flux passing area in the minimum light blocking state, the amount of light passing through the light blocking members can be increased.

Application Example 3

In the light control apparatus according to the above application example, it is preferable that each of the pair of light blocking members has a first portion having a plate-like shape and extending along the pivotal axes and a second portion extending in a direction that intersects the direction in which the first portion extends, and that the second portion is bent along an edge of the first portion that is closer to the central axis of the light flux in such a way that the second portion is oriented toward the downstream side of the optical path of the light flux when the light blocking area is maximized and the second portion has a cutout at an edge located on the downstream side of the optical path of the light flux.

According to the configuration described above, the second portion is located on the downstream side of the edge of the first portion that is closer to the central axis of the light flux in the optical path direction in the maximum light blocking state, and the second portion has a cutout at the edge located on the downstream side of the optical path. As a result, the contour of the edge of the second portion viewed from the downstream side of the optical path in the direction of the central axis of the light flux changes as the pivotal members pivot, whereby the size of the light blocking area can be more moderately changed as the pivotal members pivot.

Application Example 4

In the light control apparatus according to the above application example, the angle between the first portion and the second portion of each of the pair of light blocking members is preferably an acute angle.

According to the configuration described above, since the angle between the first portion and the second portion of each of the light blocking members is an acute angle, the distance from the edge of the second portion to the corresponding pivotal axis can be shorter than the distance from the edge of the first portion that is located on the second portion side to the pivotal axis. As a result, the light control can be more smoothly performed without any increase in the range over which the light blocking members are moved. Further, since the second portion extends along the central axis of the light flux in the maximum light blocking state, the light blocking area can be enlarged in the maximum light blocking state.

Application Example 5

In the light control apparatus according to the above application example, it is preferable that each of the pair of light blocking members further has a third portion located on the opposite side of the first portion to the second portion and extending in a direction that intersects the direction in which the first portion extends, and that the third portion is so disposed to be oriented outward with respect to the central axis of the light flux when the light blocking area is minimized.

According to the configuration described above, since the third portion, which extends from the first portion away from the second portion, is bent outward with respect to the central axis of the light flux and hence located outside the light flux passing area, the size of the light blocking area can be reduced in the minimum light blocking state as compared with a case where the first portion is parallel to the third portion. Further, the light blocking area can be enlarged in the maximum light blocking state.

Application Example 6

This application example is directed to a projector including a light source apparatus that emits a light flux, a light modulation apparatus that modulates the light flux emitted from the light source apparatus, a projection optical apparatus that projects the light modulated by the light modulation apparatus, a first lens array that divides the light flux from the light source apparatus into a plurality of sub-light fluxes and a second lens array that adjusts the state of the plurality of sub-light fluxes having exited from the first lens array, the first and second lens arrays disposed between the light source apparatus and the light modulation apparatus, and any of the light control apparatus described above disposed between the first lens array and the second lens array.

According to the configuration described above, since the light control apparatus, which includes pivotal members having small pivotal radii and hence having a small size and allows the light control to be smoothly performed, is disposed between the first lens array and the second lens array, a projector having a small size and capable of performing smooth light control can be provided.

BRIEF DESCRIPTION OF THE DRAWINGS

The invention will now be described with reference to the accompanying drawings, wherein like numbers refer to like elements.

DETAILED DESCRIPTION OF EMBODIMENTS

Embodiments of the invention will be described below with reference to the drawings. Throughout the drawings to which the following description refers, components are not drawn to scale as appropriate, for example, in terms of the proportion of each dimension for ease of illustration.

First Embodiment

Projector

Figure 1:
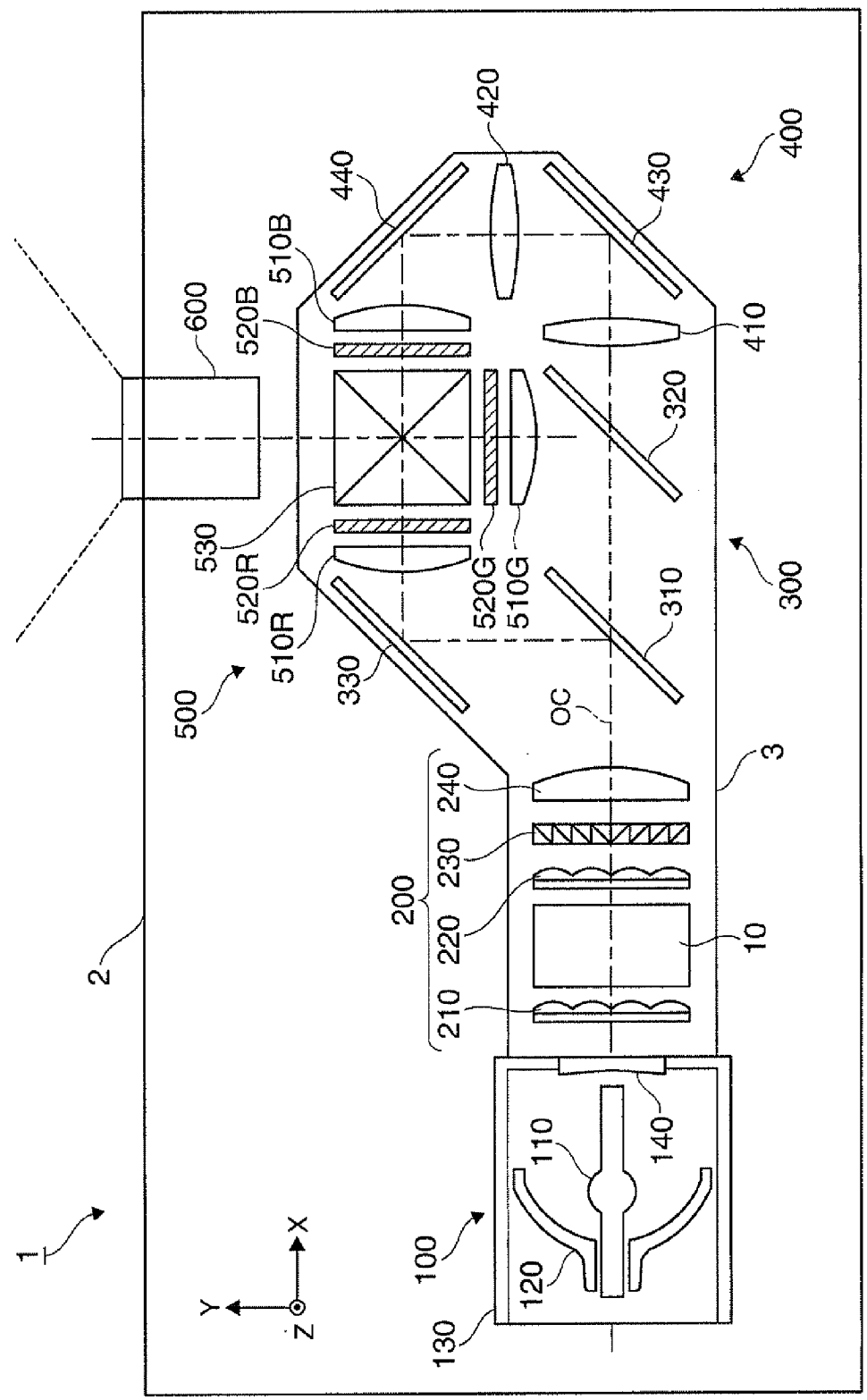
FIG. 1 is a diagrammatic view showing a schematic configuration of a projector according to a first embodiment.

A projector according to a first embodiment will first be described with reference to FIG. 1. FIG. 1 is a diagrammatic view showing a schematic configuration of the projector according to the first embodiment. A projector 1 according to the present embodiment is an electronic apparatus that modulates a light flux emitted from a light source in accordance with image information and enlarges and projects the modulated light flux on a screen or any other projection surface.

In the following drawings and description, let an X direction be the direction in which a light flux travels along an illumination optical axis OC and a Y direction be one of the directions perpendicular to the X direction, specifically, the direction extending along the horizontal direction and oriented rightward when viewed from the +X direction side. Further, let a Z direction be the direction perpendicular to the X and Y directions and oriented upward with respect to the installed projector. That is, the X, Y, and Z directions are perpendicular to each other. The +X direction represents a light flux exiting direction. In the definition described above, the −X direction side represents the upstream side of the optical path of the light flux, and the +X direction side represents the downstream side of the optical path of the light flux.

The projector 1 includes an exterior case 2, an optical part housing 3, a light source apparatus 100, an illumination optical apparatus 200, a color separation optical apparatus 300, a relay optical apparatus 400, an electro-optic apparatus 500, and a projection optical apparatus 600, as shown in FIG. 1. Optical parts that form the illumination optical apparatus 200, the color separation optical apparatus 300, the relay optical apparatus 400, and the electro-optic apparatus 500 are accommodated in the optical part housing 3. The optical part housing 3 along with the light source apparatus 100 and the projection optical apparatus 600 is fixed in the exterior case 2.

The projector 1 further includes a power supply apparatus that supplies electric power to the components in the projector 1 and a control apparatus that controls the components in the projector 1. The power supply apparatus and the control apparatus are not shown but accommodated in the space in the exterior case 2.

The light source apparatus 100 includes an arc tube 110 that emits a light flux, a reflector 120, a parallelizing concave lens 140, and a holder 130. In the light source apparatus 100, the reflector 120 reflects the light flux emitted from the arc tube 110 in a single light flux exiting direction, and the parallelizing concave lens 140 substantially parallelizes the light flux and directs it toward the illumination optical apparatus 200. The illumination optical axis OC is a central axis of the light flux that exits from the light source apparatus 100 toward an area to be illuminated.

The arc tube 110 has a light emitting portion and a pair of sealed portions extending from both sides thereof. The arc tube 110 can be any arc tube that emits light of high intensity, for example, a high-pressure mercury lamp, an ultrahigh-pressure mercury lamp, or a metal halide lamp. The reflector 120 has a reflection surface formed on an inner surface that faces the arc tube 110 and reflects the light emitted from the arc tube 110 toward the area to be illuminated.

The holder 130 is so provided that it surrounds and holds the reflector 120. The holder 130 is made, for example, of a heat-resistant synthetic resin material and has a substantially tubular shape. An opening is formed in a central portion of the forward-side end of the holder 130 in the light flux exiting direction, and the parallelizing concave lens 140 is held in the opening.

The illumination optical apparatus 200 includes a first lens array 210, a second lens array 220, a polarization conversion element 230, and a superimposing lens 240. The first lens array 210 has lenslets arranged in a matrix and divides the light flux having exited from the light source apparatus 100 into a plurality of sub-light fluxes. Each of the lenslets has a substantially rectangular contour when viewed in the direction of the illumination optical axis OC. The second lens array 220 has substantially the same configuration as that of the first lens array 210. The second lens array 220 along with the superimposing lens 240 substantially superimposes the sub-light fluxes on surfaces of liquid crystal apparatus 520, which will be described later. The polarization conversion element 230 has a function of aligning the polarization directions of the randomly polarized light fluxes having exited from the second lens array 220 into substantially one type of polarized light usable in the liquid crystal apparatus 520.

Figure 2A:
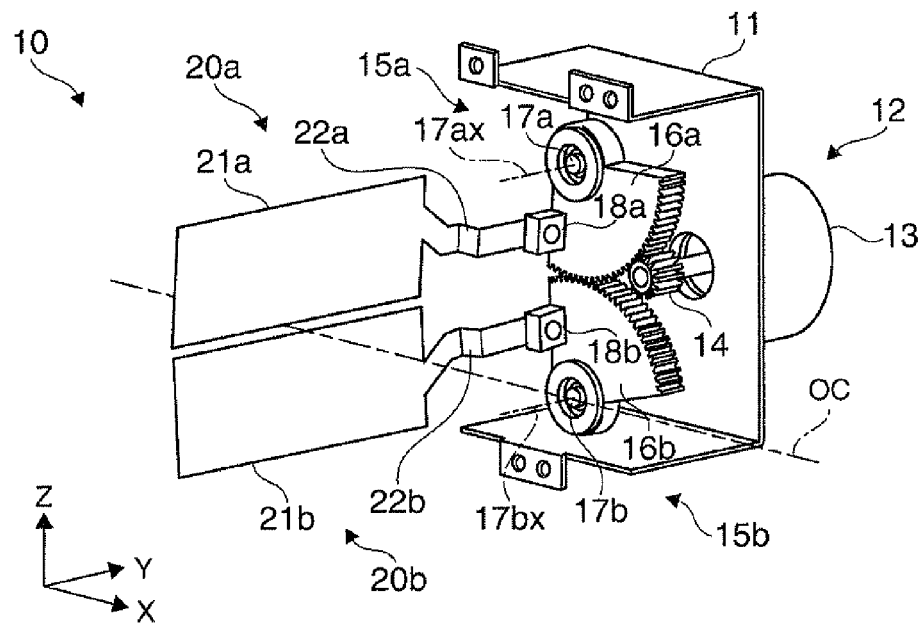
FIGS. 2A and 2B show a schematic configuration of a light control apparatus according to the first embodiment.
Figure 2B:
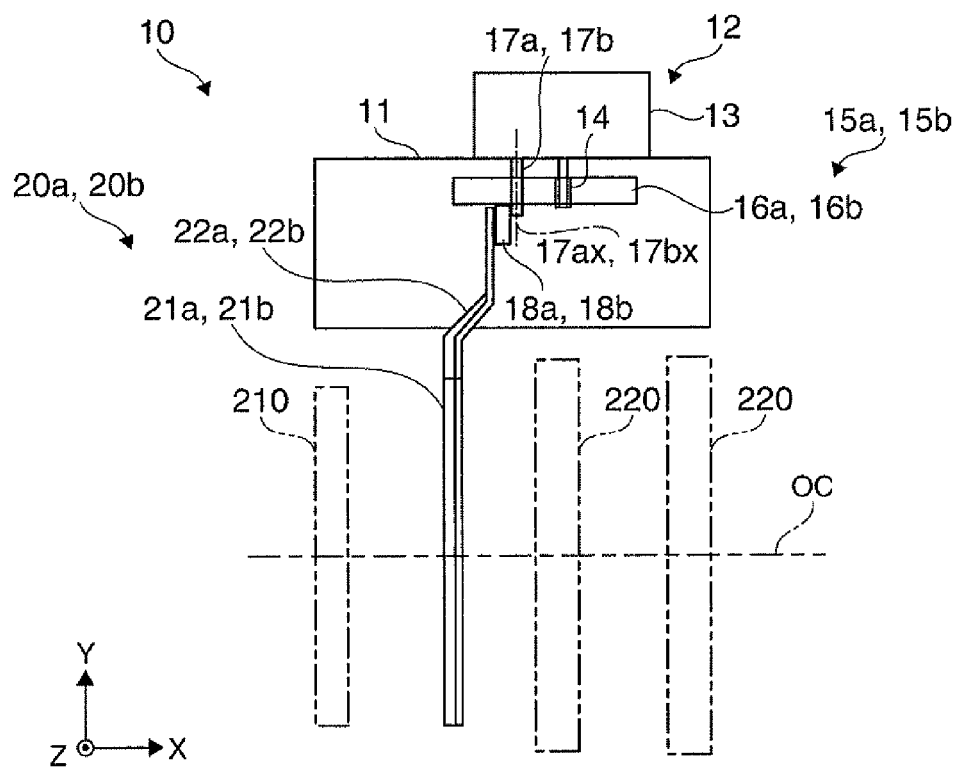

A light control apparatus 10 includes a pair of pivotal light blocking members 20a and 20b (see FIGS. 2A and 2B). The light control apparatus 10 is so disposed that the light blocking members 20a and 20b are positioned between the first lens array 210 and the second lens array 220. When the light blocking members 20a and 20b pivot, part of the light flux incident from the light source apparatus 100 is blocked and the amount of light passing through the light blocking members toward the downstream side of the optical path is controlled. A specific configuration of the light control apparatus 10 will be described later.

The color separation optical apparatus 300 includes a first dichroic mirror 310, a second dichroic mirror 320, and a reflection mirror 330. The color separation optical apparatus 300 separates the light flux having exited from the illumination optical apparatus 200 into three color light fluxes: red (R), green (G), and blue (B) light fluxes.

The relay optical apparatus 400 includes a light incident-side lens 410, a relay lens 420, and reflection mirrors 430 and 440. The relay optical apparatus 400 guides the B light separated by the color separation optical apparatus 300 to a liquid crystal apparatus 520B for B light. The relay optical apparatus 400 guides the B light in the present embodiment but does not necessarily guide the B light. For example, the relay optical apparatus 400 may guide the R light.

The electro-optic apparatus 500 includes field lenses 510R, 510G, and 51013, light incident-side polarizers (not shown), liquid crystal apparatus 520R, 520G, and 520B as light modulation apparatus, light exiting-side polarizers (not shown), and a cross dichroic prism 530. A pair of light incident-side polarizer and light exiting-side polarizer is provided for each of the liquid crystal apparatus 520R, 520G, and 520B.

The liquid crystal apparatus 520R, 520G, and 520B modulate the color light fluxes, which have been separated by the color separation optical apparatus 300, in accordance with image information. The cross dichroic prism 530 is formed by bonding four rectangular prisms and thus has a substantially square shape when viewed from above. Two dielectric multilayer films are formed along the interfaces between these bonded rectangular prisms. The cross dichroic prism 530 combines the color light fluxes modulated by the liquid crystal apparatus 520R, 520G, and 520B and outputs the combined light toward the projection optical apparatus 600.

The projection optical apparatus 600 is formed of a combination lens obtained by combining a plurality of lenses and enlarges and projects the light flux modulated and combined by the electro-optic apparatus 500 on a screen or any other projection surface.

In the projector 1, the light control apparatus 10 can control the amount of light flux to be incident on the electro-optic apparatus 500. Controlling the amount of light flux, for example, in accordance with a scene to be projected allows high dynamic contrast to be provided in the projected image.

Light Control Apparatus

The light control apparatus according to the first embodiment will next be described with reference to FIGS. 2A and 2B and FIGS. 3A and 3B. In the following figures and description, a pair of components are generally named as follows: One of the components has a suffix "a" and the other component has a suffix "b" for distinction.

Figure 3A:
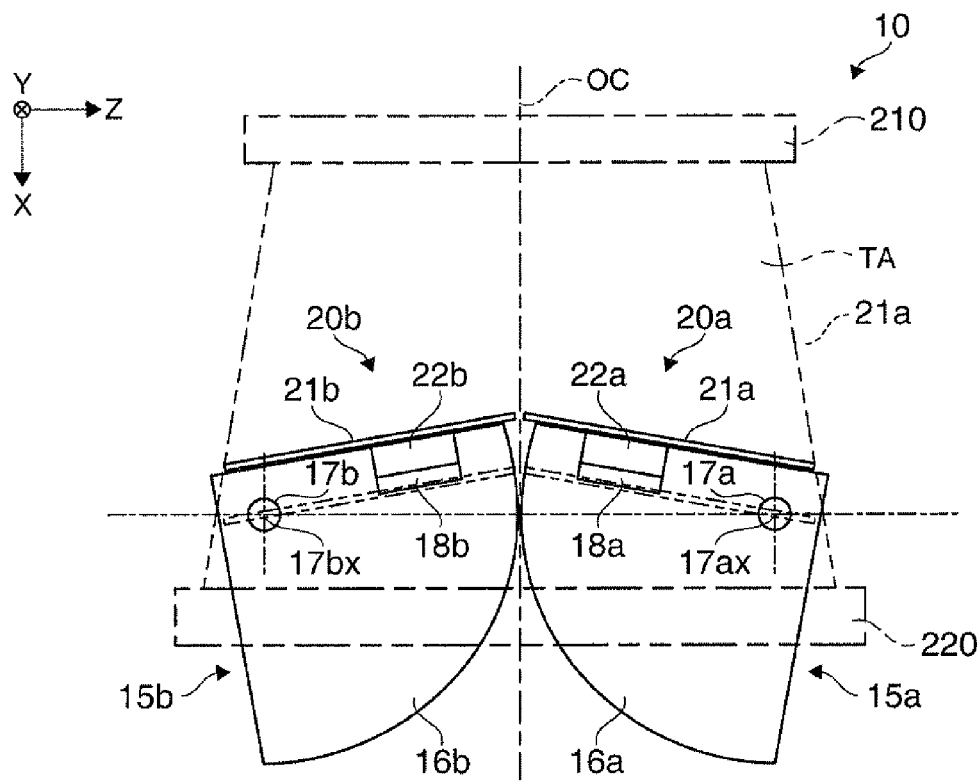
FIGS. 3A and 3B describe the range over which light blocking members are moved in the light control apparatus according to the first embodiment.
Figure 3B:
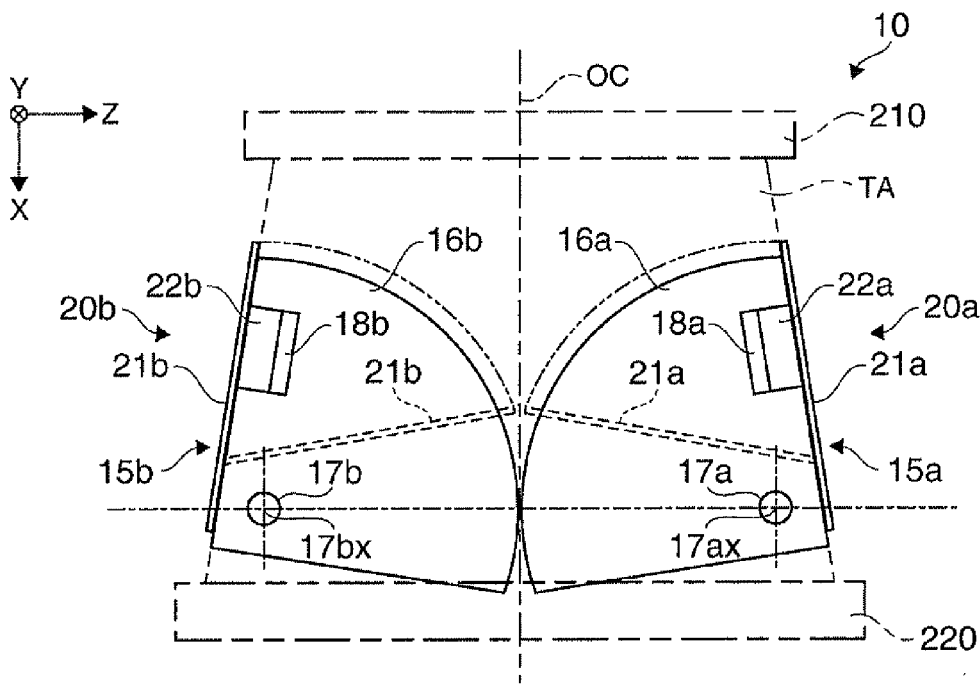

FIGS. 2A and 2B show a schematic configuration of the light control apparatus according to the first embodiment. In detail, FIG. 2A is a perspective view of the light control apparatus viewed from the +X direction side, and FIG. 2B is a plan view of the light control apparatus viewed from the +Z direction side. FIGS. 2A and 2B both show a maximum light blocking state. FIGS. 3A and 3B describe the range over which the light blocking members are moved in the light control apparatus according to the first embodiment. In detail, FIG. 3A shows the positions of the light blocking members and pivotal members in a maximum light blocking state, and FIG. 3B shows the positions of the light blocking members and pivotal members in a minimum light blocking state.

The light control apparatus 10 includes a fixed member 11, a drive mechanism 12, a pair of pivotal members 15a and 15b, and a pair of light blocking members 20a and 20b, as shown in FIGS. 2A and 213. The maximum light blocking state is a state in which the light blocking members 20a and 20b of the light control apparatus 10 block a light flux to the maximum, and the minimum light blocking state is a state in which the light blocking members 20a and 20b of the light control apparatus 10 block a light flux to the minimum.

The fixed member 11 is attached and fixed to the optical part housing 3 (see FIG. 1). The fixed member 11 is formed, for example, of a sheet metal and includes, although not shown in detail, attachment portions for attaching the fixed member 11 to the optical part housing 3 and openings and shaft receiving portions for supporting the drive mechanism 12 and the pivotal members 15a and 15b.

The drive mechanism 12 includes a motor 13 and a gear 14 that transfers rotation of the motor 13 to the pivotal members 15a and 15b. The motor 13 is located on the +Y direction side of the fixed member 11 and fixed thereto, and the gear 14 is disposed on the −Y direction side of the fixed member 11. The motor 13 is controlled by a controller (not shown) and produces a drive force for rotating the gear 14. The motor 13 can, for example, be a stepper motor. The motor 13 may alternatively be a voice coil motor or any other suitable motor, in which case, the component for transferring the rotation of the motor 13 is not limited to the gear 14.

The pivotal members 15a and 15b include gears 16a and 16b, which are pivotal portions, pivotal motion support shafts 17a and 17b, holders 18a and 18b for holding the light blocking members 20a and 20b. The gears 16a and 16b are sized in accordance with the range over which the light blocking members 20a and 20b are moved and have substantially quadrant shapes when viewed in the Y direction. Pivotal axes 17ax and 17bx, which are central axes of the pivotal motion support shafts 17a and 17b, extend along the Y direction, which is substantially perpendicular to the illumination optical axis OC.

The gears 16a and 16b are supported by the fixed member 11 via the pivotal motion support shafts 17a and 17b and pivotal around the pivotal axes 17ax and 17bx. The gears 16a and 16b engage with each other, and one of the gears 16a and 16b engages with the gear 14. When the rotation of the motor 13 is transferred to the gears 16a and 16b via the gear 14, the gears 16a and 16b pivot in opposite directions in synchronization with each other. The holders 18a and 18b are provided on the Y direction-side surfaces of the gears 16a and 16b in positions set apart from the pivotal motion support shafts 17a and 17b.

The light blocking members 20a and 20b are so disposed that they face each other on opposite sides of the illumination optical axis OC. More specifically, the light blocking member 20a is disposed on the +Z direction side, and the light blocking member 20b is disposed on the −Z direction side. The light blocking members 20a and 20b are then inserted into the space between the first lens array 210 and the second lens arrays 220 from the +Y direction side (see FIG. 2B). The light blocking members 20a and 20b are formed, for example, in a sheet metal press working process and have light blocking plates 21a and 21b and supports 22a and 22b.

The light blocking plates 21a and 21b have substantially flat-plate shapes extending along the pivotal axes 17ax and 17bx, that is, along the Y direction. The supports 22a and 22b have narrow plate-like shapes having widths in the Z direction narrower than those of the light blocking plates 21a and 21b and extend from the light blocking plates 21a and 21b toward the +Y direction side. The supports 22a and 22b are bent toward the X direction at middle points in the extending direction, and front-side portions of the supports 22a and 22b in the extending direction are fixed to the holders 18a and 18b. The light control apparatus 10 has what is called a cantilever structure in which ends of the light blocking members 20a and 20b (supports 22a and 22b) are supported.

Light blocking actions of the light blocking members 20a and 20b will next be described with reference to FIGS. 3A and 3B. In FIGS. 3A and 3B, the first lens array 210, the second lens array 220, and a light flux passing area TA where a light flux travels between the first and second lens arrays are drawn by double-dashed dotted lines. The first lens array 210 and the second lens arrays 220 are so disposed that they are substantially parallel to each other and substantially perpendicular to the illumination optical axis OC. When a light flux travels from the first lens array 210 to the second lens arrays 220, the width of the light flux typically increases.

The pivotal axes 17ax and 17bx of the pivotal members 15a and 15b are located in positions that overlap with the light flux passing area TA when viewed in the Y direction, as shown in FIGS. 3A and 3B. More specifically, the pivotal axes 17ax and 17bx are shifted from the second lens array 220 in the X direction toward the first lens array 210 and located inside the outer edges of the light flux passing area TA in the Z direction (toward illumination optical axis OC). The distance between the pivotal axes 17ax and 17bx is therefore smaller than that in a case where the pivotal axes 17ax and 17bx are located outside the light flux passing area TA. That is, since the radii of pivotal motion of the pivotal members 15a and 15b are reduced, the sizes of the pivotal members 15a and 15b can be reduced. When the rotation of the motor 13 (see FIGS. 2A and 213) is transferred to the pivotal members 15a and 15b, they pivot between their positions in the maximum light blocking state shown in FIG. 3A and their positions in the minimum light blocking state shown in FIG. 3B.

The light blocking members 20a and 20b are disposed in positions that do not overlap with the pivotal axes 17ax and 17bx when viewed in the Y direction. In the maximum light blocking state shown in FIG. 3A, the light blocking plates 21a and 21b are located on the upstream side of the pivotal axes 17ax and 17bx in the optical path direction, for example, in positions that substantially overlap with the upstream-side edges of the pivotal members 15a and 15b (gears 16a and 16b) in the optical path direction. In this state, the light blocking plates 21a and 21b cover nearly the entire light flux incident surface of the second lens array 220 so that the amount of light flux passing through the light blocking plates is minimized.

Now, assume that the light blocking plates 21a and 21b are translated toward the downstream side of the optical path along the illumination optical axis OC to positions that overlap with the pivotal axes 17ax and 17bx, as indicated by the double-dashed dotted lines shown in FIG. 3A. In this case, since the light flux spreads outward as it approaches the second lens array 220, the portion of the light flux that is not blocked by the light blocking plates 21a and 21b increases. It is therefore necessary to enlarge the light blocking plates 21a and 21b in order to block the same amount of light flux as that in the present embodiment in the maximum light blocking state. In contrast, the present embodiment, in which the light blocking plates 21a and 21b are located on the upstream side of the pivotal axes 17ax and 17bx in the optical path direction, allows the sizes of the light blocking plates 21a and 21b to be smaller than those in a case where the light blocking plates overlap with the pivotal axes.

On the other hand, assume that the light blocking plates 21a and 21b are located on the upstream side of the pivotal axes 17ax and 17bx in the optical path direction, but that the pivotal axes are so located that they are shifted toward the downstream side of the optical path from those in the present embodiment, for example, in positions that overlap with the second lens array 220 as in the case of the projector described in JP-A-2009-216906. In this case, since the portion of the light flux that is not blocked by the light blocking plates 21a and 21b increases as in the case described above, it is necessary to enlarge the light blocking plates 21a and 21b in order to block the same amount of light flux as that in the present embodiment. Locating the pivotal axes 17ax and 17bx on the upstream side of the second lens array 220 in the optical path direction therefore allows the sizes of the light blocking plates 21a and 21b to be reduced.

The light blocking plates 21a and 21b are so inclined to the second lens array 220 that the edges of the light blocking plates 21a and 21b that are closer to the illumination optical axis OC are closer to the first lens array 210 than the other edges. The inclination angles of the light blocking plates 21a and 21b to the second lens array 220, for example, range from approximately 5 to 10 degrees. The inclination angles of the light blocking plates 21a and 21b to the second lens array 220 are not limited to values within the angular range described above but may be set as appropriate in accordance with the positional relationship between the light blocking plates 21a, 21b and the pivotal axes 17ax, 17bx, the pivotal angle range, and other factors.

When the light blocking plates 21a and 21b are so disposed that they are parallel to the second lens array 220, the light flux incident from the first lens array 210 may in some cases be reflected off the light blocking plates 21a and 21b toward the upstream side of the optical path and returns to the light source apparatus 100, and the temperature in the light source apparatus 100 may increase. In contrast, when the light blocking plates 21a and 21b are inclined to the second lens array 220, the light reflected off the light blocking plates 21a and 21b does not return to the light source apparatus 100 but is directed outward with respect to the illumination optical axis OC.

The edges of the light blocking plates 21a and 21b that are closer to the illumination optical axis OC may protrude beyond the pivotal members 15a and 15b (gears 16a and 16b) toward the illumination optical axis OC. The configuration allows the light blocking area to be enlarged toward the illumination optical axis OC even when the light blocking plates 21a and 21b are inclined to the second lens array 220, whereby the amount of light flux passing through the light blocking plates can be further reduced. The distance between the light blocking plates 21a and 21b is so set as appropriate that the edges thereof do not come into contact with each other.

In the minimum light blocking state shown in FIG. 3B, the light blocking plates 21a and 21b are located outside the pivotal axes 17ax and 17bx with respect to the illumination optical axis OC. The light blocking plates 21a and 21b are located, for example, along the outer edges of the light flux passing area TA when viewed in the Y direction. In this state, the light blocking plates 21a and 21h scarcely cover the light flux incident surface of the second lens array 220, whereby the amount of light flux passing through the light blocking plates is maximized.

The light blocking plates 21a and 21b pivot between their positions in the minimum light blocking state indicated by the solid lines and their positions in the maximum light blocking state indicated by the broken lines as the pivotal members 15a and 15b pivot, whereby the area where the light flux is blocked by the light blocking plates 21a and 21b is changed and the amount of light passing through the light blocking plates is controlled. When the radii of pivotal motion of the pivotal members 15a and 15b are smaller, the angular range over which the pivotal members 15a and 15b pivot in the light flux passing area TA can be greater. In this way, the size of the light blocking area changes more moderately as the pivotal members 15a and 15b pivot and hence the light blocking plates 21a and 21b move. That is, since the amount of light passing through the light blocking plates 21a and 21b changes less sharply as the light blocking plates move, the light control can be more smoothly performed.

In addition to the components described above, the light control apparatus 10 may further include sensor units that detect the positions of the light blocking members 20a and 20b and output detection signals to the controller.

The thus configured light control apparatus 10 according to the first embodiment and the projector 1 including the light control apparatus 10 provide the following advantages.

1. Since the pivotal axes 17ax and 17bx are located in positions that overlap with the light flux passing area TA, the radii of pivotal motion of the pivotal members 15a and 15b can be smaller than those in a case where the pivotal axes are located outside the light flux passing area TA. The sizes of the pivotal members 15a and 15b can therefore be reduced.

2. Since the light blocking plates 21a and 21b are located in positions that do not overlap with the pivotal axes 17ax and 17bx, the sizes of the light blocking plates 21a and 21b can be reduced as compared with a case where the light blocking plates are located in positions that overlap with the pivotal axes. Even when the sizes of the light blocking plates 21a and 21b are reduced, the amount of light passing through the light blocking plates can be reduced in the maximum light blocking state.

3. Since the pivotal axes 17ax and 17bx are located on the upstream side of the second lens array 220 in the optical path direction, the sizes of the light blocking plates 21a and 21b can be reduced as compared with a case where the pivotal axes are located in positions that overlap with the second lens array 220. Even when the sizes of the light blocking plates 21a and 21b are reduced, the amount of light passing through the light blocking plates can be reduced in the maximum light blocking state.

4. Since the radii of pivotal motion of the pivotal members 15a and 15b are reduced, the angular range over which the pivotal members 15a and 15b pivot in the light flux passing area TA can be increased. As a result, the size of the light blocking area changes more moderately as the light blocking plates 21a and 21b move, the light control can be more smoothly performed.

5. Since the sizes of the pivotal members 15a and 15b and the light blocking plates 21a and 21b can be reduced as described above, the size of the light control apparatus 10 and hence the size of the projector 1 can be reduced. Further, even when the sizes are reduced, the light control apparatus 10 and the projector 1 can be so configured that the amount of light passing through the light blocking plates can be reduced in the maximum light blocking state and the light control can be smoothly performed.

Second Embodiment

Light Control Apparatus

Figure 4A:
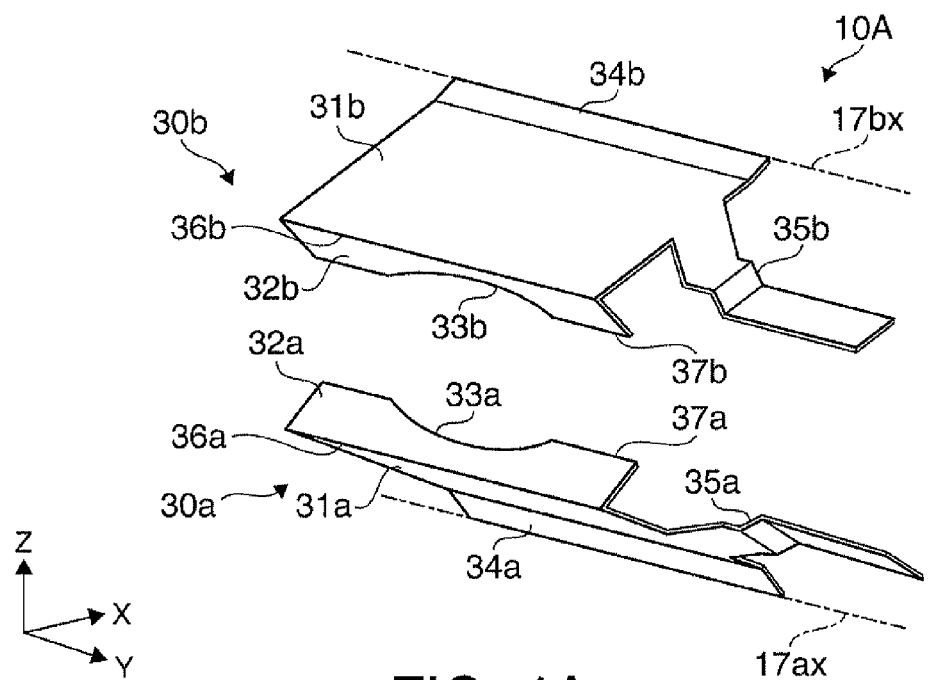
FIGS. 4A and 4B show a schematic configuration of a light control apparatus according to a second embodiment.
Figure 4B:
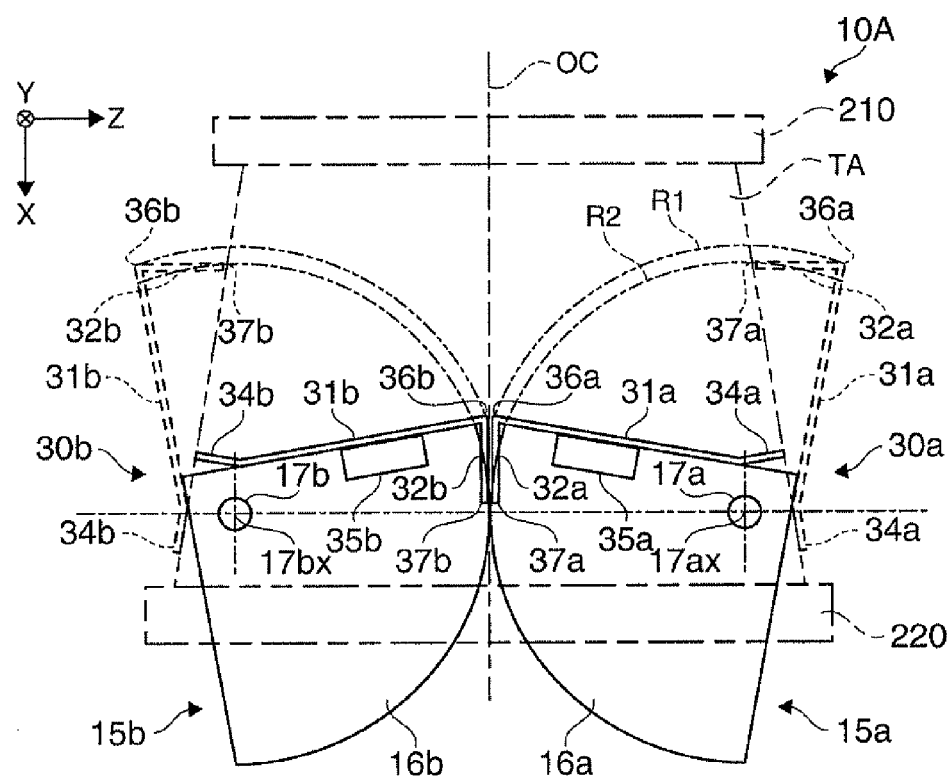
Figure 5A:
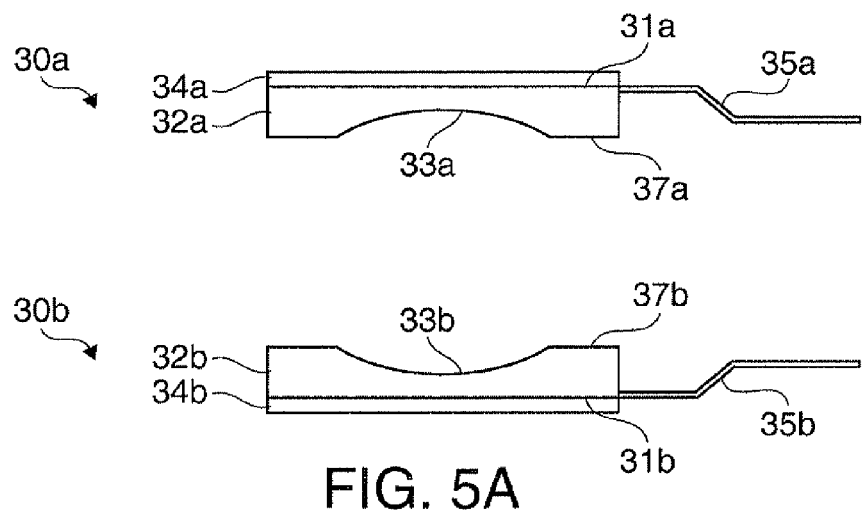
FIGS. 5A to 5C show light blocking members in each action state viewed from a −X direction side.
Figure 5B:
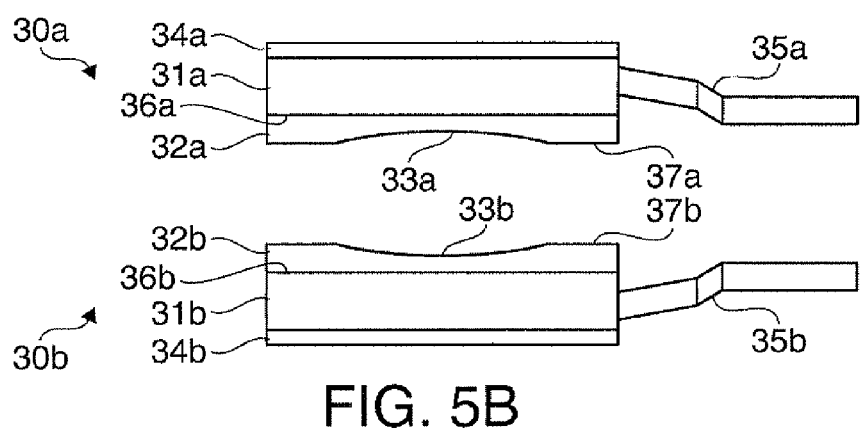
Figure 5C:
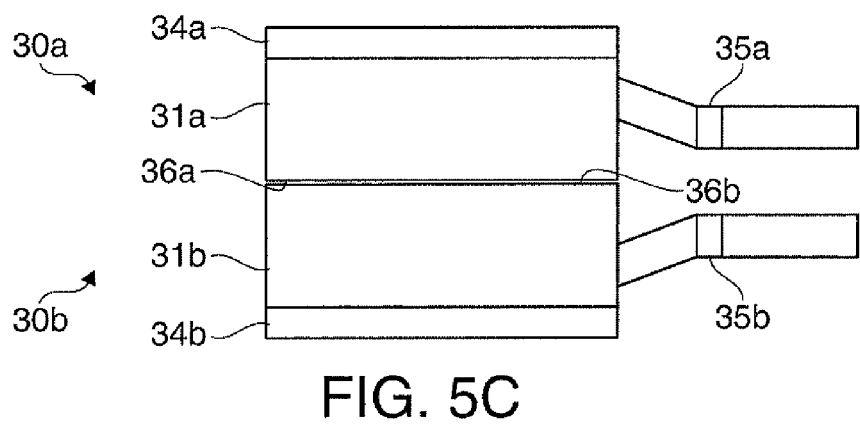

A light control apparatus according to a second embodiment will next be described with reference to FIGS. 4A and 4B and 5A to 5C. FIGS. 4A and 4B show a schematic configuration of the light control apparatus according to the second embodiment. In detail, FIG. 4A is a perspective view of light blocking members viewed from the −X direction side, and FIG. 413 describes the range over which the light blocking members are moved. FIGS. 5A to 5C show the light blocking members in different action states viewed from the −X direction side. In detail, FIG. 5A shows the light blocking members in the minimum light blocking state. FIG. 5B shows the light blocking members in an intermediate light blocking state in which the light blocking members are not fully pivoted. FIG. 5C shows the light blocking members in the maximum light blocking state.

The light control apparatus according to the second embodiment differs from the light control apparatus according to the first embodiment in terms of the shapes of the light blocking members but is substantially the same as the light control apparatus according to the first embodiment in terms of other configurations. The components common to those in the first embodiment have the same reference characters, and no description will be made of these components.

A light control apparatus 10A according to the second embodiment includes the fixed member 11, the drive mechanism 12, the pair of pivotal members 15a and 15b (see FIGS. 2A and 2B for these components), and a pair of light blocking members 30a and 30b shown in FIG. 4A.

The light blocking members 30a and 30b are formed, for example, in a sheet metal press working process and have light blocking plate bodies 31a and 31b as first portions, front end portions 32a and 32b as second portions, and tail end portions 34a and 34b as third portions. The light blocking plate bodies 31a and 31b have flat-plate shapes extending along the pivotal axes 17ax and 17bx.

The front end portions 32a and 32b extend in a direction that intersects the direction in which the light blocking plate bodies 31a and 31b extend. The front end portions 32a and 32b are so formed that they are bent along edges 36a and 36b of the light blocking plate bodies 31a and 31b toward the downstream side of the optical path in the maximum light blocking state. The angles between the light blocking plate bodies 31a, 31b and the front end portions 32a, 32b are acute angles. The angles between the light blocking plate bodies 31a, 31b and the front end portions 32a, 32b are set as appropriate in accordance with the positional relationship between the light blocking plate bodies 31a, 31h and the pivotal axes 17ax, 17bx, the pivotal angle range, and other factors.

The front end portions 32a and 32b have arcuate cutouts 33a and 33b formed at edges 37a and 37b that face away from the edges 36a and 36b of the light blocking plate bodies 31a and 31b. The edges 37a and 37b therefore have cutout shapes concave in the direction from the edges 37a and 37b toward the edges 36a and 36b, that is, in the direction away from the illumination optical axis OC.

The tail end portions 34a and 34b are located on the opposite side of the light blocking plate bodies 31a and 31b to the front end portions 32a and 32b and extend in a direction that intersects the direction in which the light blocking plate bodies 31a and 31b extend. The tail end portions 34a and 34b are so located that they are bent toward the upstream side of the light blocking plate bodies 31a and 31b in the optical path direction. Since the light blocking members 30a and 30b have the front end portions 32a and 32b and the tail end portions 34a and 34b connected to the respective edges of the light blocking plate bodies 31a and 31b and bent with respect thereto, the light blocking members 30a and 30b have greater strength than that of the light blocking members 20a and 20b in the first embodiment.

In the maximum light blocking state, the light blocking plate bodies 31a and 31b are located on the upstream side of the pivotal axes 17ax and 17bx in the optical path direction and in positions that substantially overlap with the upstream-side edges of the pivotal members 15a and 15b (gears 16a and 16b) in the optical path direction when viewed in the Y direction, as indicated by the solid lines in FIG. 4B. The edges 36a and 36b of the light blocking plate bodies 31a and 31b that are closer to the illumination optical axis OC protrude beyond the pivotal members 15a and 15b toward the illumination optical axis OC.

The front end portions 32a and 32b are so formed that they are bent along the edges 36a and 36b of the light blocking plate bodies 31a and 31b toward the downstream side of the optical path and substantially parallel to the illumination optical axis OC. The edges 37a and 37b of the front end portions 32a and 32b are therefore closer to the second lens array 220 than the edges 36a and 36b. The inclination angles of the light blocking plate bodies 31a and 31b with respect to the second lens array 220, for example, range from approximately 5 to 10 degrees. The inclination angles of the lines connecting the edges 37a and 37b to the pivotal axes 17ax and 17bx with respect to the second lens array 220 is, for example, approximately 2 degrees.

As described above, the edges 37a and 37b are closer to the second lens array 220 than the edges 36a and 36b. Since the light flux spreads outward as is approaches the second lens array 220, the amount of light flux passing through the space between the light blocking members 30a and 30b located on opposite sides of the illumination optical axis OC can be reduced by providing the front end portions 32a and 32b even with the distance between the edges 37a and 37b equal to the distance between the edges 36a and 36b. The configuration of the light blocking members 30a and 30b according to the second embodiment therefore allows the amount of light flux passing through the light blocking members to be reduced in the maximum light blocking state as compared with the configuration of the light blocking members 20a and 20b according to the first embodiment.

Further, since the tail end portions 34a and 34b are bent toward the upstream side of the optical path with respect to the light blocking plate bodies 31a and 31b in the maximum light blocking state, the amount of light flux passing through the portions outside the light blocking members 30a and 30b with respect to the illumination optical axis OC can be reduced as compared with a case where the tail end portions 34a and 34b are parallel to the light blocking plate bodies 31a and 31b.

The distances between the edges 37a, 37b and the pivotal axes 17ax, 17bx are smaller than the distances between the edges 36a, 36b and the pivotal axes 17ax, 17bx. The edges 37a and 37b are located in positions that substantially overlap with the arcuate outer circumferences of the pivotal members 15a and 15b. As a result, when the light blocking members 30a and 30b pivot between their positions in the maximum light blocking state indicated by the solid lines and their positions in the minimum light blocking state indicated by the broken lines, the paths along which the edges 37a and 37b move are located inside the paths of the edges 36a and 36b (closer to the pivotal axes 17ax and 17bx).

Assume now that the angles between the light blocking plate bodies 31a, 31b and the front end portions 32a, 32b are obtuse angles. In this case, when the light blocking members 30a and 30b pivot, the paths along which the edges 37a and 37b move are located outside the paths of the edges 36a and 36b, and the edges 37a and 37b of the front end portions 32a and 32b disadvantageously come into contact with each other before the maximum light blocking state shown in FIG. 4B is reached.

In contrast, when the angles between the light blocking plate bodies 31a, 31b and the front end portions 32a, 32b are acute angles as set in the second embodiment, the size of the light control apparatus 10A can be reduced as in the first embodiment even when the light blocking members 30a and 30b have the front end portions 32a and 32b extending from the edges 36a and 36b of the light blocking plate bodies 31a and 31b.

The pivotal angles of the gears 16a and 16b from the maximum light blocking state to the minimum light blocking state are larger than those in the first embodiment, and the edges 36a and 36b of the light blocking plate bodies 31a and 31b move across the light flux passing area TA to positions outside the corresponding edges of the light blocking plates 21a and 21b in the first embodiment, as indicated by the broken lines in FIG. 4B. The edges 37a and 37b of the front end portions 32a and 32b and the tail end portions 34a and 34b are so located that they overlap with the outer edges of the light flux passing area TA.

Assume now that the light blocking plate bodies 31a and 31b are parallel to the tail end portions 34a and 34b. In this case, since the edges 36a and 36b of the light blocking plate bodies 31a and 31b move across the light flux passing area TA to positions corresponding to those outside the light blocking plates 21a and 21b in the first embodiment, the tail end portions 34a and 34b are disadvantageously located in the light flux passing area TA in the minimum light blocking state. Since the light blocking members 30a and 30b according to the second embodiment are so configured that the tail end portions 34a and 34b are bent outward from the light blocking plate bodies 31a and 31b with respect to the light flux passing area TA, the tail end portions 34a and 34b can be located outside the light flux passing area TA in the minimum light blocking state. The amount of light flux passing through the light blocking members in the minimum light blocking state can therefore be increased as compared with a case where the light blocking plate bodies 31a and 31h are parallel to the tail end portions 34a and 34b.

A description will next be made of change in the shape of the light blocking members 30a and 30b in each action state viewed from the −X direction side, that is, viewed from the upstream side of the optical path. Change in the shape of the light blocking members 30a and 30b viewed from the downstream side of the optical path is, of course, the same as that viewed from the upstream side of the optical path.

In the minimum light blocking state, a deep arch-shaped contour is formed by the arcuate cutouts 33a and 33b of the front end portions 32a and 32b as shown in FIG. 5A, whereas in the intermediate state, the arch-shaped contour formed by the cutouts 33a and 33b becomes slightly shallower than that in the minimum light blocking state as shown in FIG. 5B. As a result, the amount of light passing through the opening having the arch-shaped contour gradually and hence moderately changes with the pivotal angle. On the other hand, in the maximum light blocking state, since the front end portions 32a and 32b are substantially parallel to the illumination optical axis OC as shown in FIG. 5C, the amount of light passing through the opening does not reflect the shapes of the cutouts 33a and 33b, and a straight contour is formed along the contours of the light blocking plate bodies 31a and 31b.

As described above, in the second embodiment, not only can the change in the amount of light blocked by the light blocking members 30a and 30b be more moderate than the change in the amount of light blocked by the light blocking members 20a and 20b in the first embodiment, but also the amount of light passing through the light blocking members can be sufficiently reduced in the maximum light blocking state.

The thus configured light control apparatus 10A according to the second embodiment provides the following advantages.

1. The size of the light control apparatus 10A can be reduced, as in the first embodiment.

2. Since the light blocking members 30a and 30b have the front end portions 32a and 32b bent toward the downstream side of the optical path with respect to the light blocking plate bodies 31a and 31b and located in substantially parallel to the illumination optical axis OC in the maximum light blocking state, the amount of light flux passing through the light blocking members in the maximum light blocking state can be smaller than that in the first embodiment.

3. Since the cutouts 33a and 33b are provided at the edges 37a and 37b of the front end portions 32a and 32b, the amount of light flux passing through the light blocking members gradually changes as the arch-shaped contour formed by the cutouts 33a and 33b changes with the pivotal angle, whereby the amount of light passing through the light blocking members can be changed more moderately than in the first embodiment.

Light control apparatus and projectors have been described above with reference to the above embodiments of the invention, but the invention is not limited thereto. A variety of changes can be made to the embodiments to the extent that the changes do not depart from the substance of the invention. For example, the following variations are conceivable.

Variation 1

In the projector 1 in the embodiments described above, the light control apparatus 10 and 10A are so configured that the pair of light blocking members 20a/20b and 30a/30b are inserted between the first lens array 210 and the second lens array 220 from the +Y direction side, but the light control apparatus 10 and 10A are not necessarily configured this way. The light control apparatus 10 and 10A may alternatively be so configured that the light blocking members 20a/20b and 30a/30b are inserted between the first lens array 210 and the second lens array 220 in any other direction, for example, from the +Z direction side.

Variation 2

In the light control apparatus 10 and 10A in the embodiments described above, a pair of light blocking members 20a/20b and 30a/30b have symmetric shapes with respect to the illumination optical axis OC, but the light blocking members are not necessarily configured this way. The light blocking members may have asymmetric shapes in accordance with the characteristics of the light source apparatus and other factors.

Variation 3

The projector 1 in the embodiments described above is a transmissive projector including transmissive liquid crystal apparatus 520, each of which transmits light as a light modulation apparatus and has a light flux incident surface and a light flux exiting surface separate from each other, but the invention is not limited to the thus configured projector. The projector may be a reflective projector including reflective liquid crystal apparatus, each of which reflects light and has a single common surface as the light flux incident surface and the light flux exiting surface. When the invention is applied to a reflective projector, the same advantages can be provided as those provided in a transmissive projector.

Variation 4

The projector 1 in the embodiments described above is a projector using three liquid crystal apparatus as light modulation apparatus, but the invention is not limited to the thus configured projector. For example, the invention is also applicable to a projector using one, two, or four or more liquid crystal apparatus.

Variation 5

In the configuration of the projector 1 in the embodiments described above, the liquid crystal apparatus 520 are used as light modulation apparatus, but the invention is not limited to the thus configured projector. The light modulation apparatus may, in general, be any apparatus that modulate incident light in accordance with image information and may, for example, be micro-mirror light modulation apparatus. An example of the micro-mirror light modulation apparatus can be a DMD (digital micro-mirror device, a trademark of Texas Instruments Incorporated).

Variation 6

The invention is applicable not only to a front projection projector that projects a projection image from the observation side but also to a rear projection projector that projects a projection image from the side opposite the observation side.

This application claims priority to Japanese Application JP 2010-141395 filed in Japan on Jun. 22, 2010, the entire disclosure of which is hereby incorporated in its entirety.

What is claimed is:

1. A light control apparatus that controls an amount of light passing therethrough by blocking part of an incident light flux in a light blocking area, the apparatus comprising:
   a pair of pivotal members having pivotal axes extending along a direction substantially perpendicular to a central axis of the light flux; and
   a pair of light blocking members held by the pair of pivotal members, and blocking the incident light flux in the light blocking area, a size of the light blocking area changing as the pair of pivotal members pivot,
   the pivotal axes being located in positions that overlap with an area where the light flux passes, the pair of light blocking members being located in positions that do not overlap with the pivotal axes,
   the pair of light blocking members being located on an upstream side of the pivotal axes in an optical path direction of the light flux when the light blocking area is maximized,
   the pair of light blocking members being moved outward with respect to the light flux passing area as the light blocking area becomes smaller, and
   each of the pair of light blocking members including:
      a first portion having a plate-like shape and extending along the pivotal axes; and
      a second portion extending in a direction that intersects the direction in which the first portion extends,
      the second portion being bent along an edge of the first portion closest to the central axis of the light flux, and being oriented toward a downstream side of the optical path of the light flux when the light blocking area is maximized, the second portion having a cutout at an edge located on the downstream side of the optical path of the light flux.

2. The light control apparatus according to claim 1, an angle between the first portion and the second portion of each of the pair of light blocking members being an acute angle.

3. The light control apparatus according to claim 1, each of the pair of light blocking members further having a third portion located on an opposite side of the first portion to the second portion and extending in a direction that intersects the direction in which the first portion extends, and
   the third portion being oriented outward with respect to the central axis of the light flux when the light blocking area is minimized.

4. A projector comprising:
   the light control apparatus of claim 1;
   a light source apparatus that emits a light flux;
   a light modulation apparatus that modulates the light flux emitted from the light source apparatus;
   a projection optical apparatus that projects the light modulated by the light modulation apparatus;
   a first lens array that divides the light flux from the light source apparatus into a plurality of sub-light fluxes and a second lens array that adjusts the state of the plurality of sub-light fluxes having exited from the first lens array, the first and second lens arrays disposed between the light source apparatus and the light modulation apparatus; and
   the light control apparatus being disposed between the first lens array and the second lens array.

5. A projector comprising:
   the light control apparatus according to claim 2;
   a light source apparatus that emits a light flux;
   a light modulation apparatus that modulates the light flux emitted from the light source apparatus;
   a projection optical apparatus that projects the light modulated by the light modulation apparatus;
   a first lens array that divides the light flux from the light source apparatus into a plurality of sub-light fluxes and a second lens array that adjusts the state of the plurality of sub-light fluxes having exited from the first lens array, the first and second lens arrays disposed between the light source apparatus and the light modulation apparatus; and
   the light control apparatus being disposed between the first lens array and the second lens array.

6. A projector comprising:
   the light control apparatus according to claim 3;
   a light source apparatus that emits a light flux;
   a light modulation apparatus that modulates the light flux emitted from the light source apparatus;
   a projection optical apparatus that projects the light modulated by the light modulation apparatus;
   a first lens array that divides the light flux from the light source apparatus into a plurality of sub-light fluxes and a second lens array that adjusts the state of the plurality of sub-light fluxes having exited from the first lens array, the first and second lens arrays disposed between the light source apparatus and the light modulation apparatus; and
   the light control apparatus being disposed between the first lens array and the second lens array.

7. A light control apparatus that controls an amount of light passing therethrough by blocking part of an incident light flux in a light blocking area, the apparatus comprising:
   a pair of pivotal members having pivotal axes located in positions that overlap with an area where the light flux passes; and
   a pair of light blocking members held by the pair of pivotal members, the pair of light blocking members being disposed to not overlap with the pivotal axes,
   the pair of light blocking members being configured to move between a maximized light blocking state and a minimized light blocking state, the pair of light blocking members being inclined towards an upstream side of an optical path of the light flux when in the maximized light blocking state.

8. A projector comprising:

the light control apparatus according to claim 7;

a light source apparatus that emits a light flux;

a light modulation apparatus that modulates the light flux emitted from the light source apparatus;

a projection optical apparatus that projects the light modulated by the light modulation apparatus;

a first lens array that divides the light flux from the light source apparatus into a plurality of sub-light fluxes and a second lens array that adjusts the state of the plurality of sub-light fluxes having exited from the first lens array, the first and second lens arrays disposed between the light source apparatus and the light modulation apparatus; and the light control apparatus being disposed between the first lens array and the second lens array.

9. The light control apparatus according to claim 7, further comprising a sensor unit to detect a position of the light blocking members.

10. The light control apparatus according to claim 7, each of the pair of light blocking members including:

a first portion having a plate-like shape and extending along the pivotal axes; and a second portion extending in a direction that intersects the direction in which the first portion extends, the second portion being bent along an edge of the first portion closest to a central axis of the light flux, and being oriented toward a downstream side of the optical path of the light flux when the light blocking area is maximized, the second portion having a cutout at an edge located on the downstream side of the optical path of the light flux.

11. The light control apparatus according to claim 10, an angle between the first portion and the second portion of each of the pair of light blocking members being an acute angle.

12. The light control apparatus according to claim 10, each of the pair of light blocking members further having a third portion located on an opposite side of the first portion to the second portion and extending in a direction that intersects the direction in which the first portion extends, and the third portion being oriented outward with respect to the central axis of the light flux when the light blocking area is minimized.

* * * * *